US012732800B2

(12) United States Patent
Hiransuthikul

(10) Patent No.: US 12,732,800 B2
(45) Date of Patent: Sep. 8, 2026

(54) SYNCING MOBILE DEVICE OFFLINE ACTIONS WITH REMOTE SERVERS

(71) Applicant: Google LLC, Mountain View, CA (US)

(72) Inventor: Nakarin Hiransuthikul, Mountain View, CA (US)

(73) Assignee: Google LLC, Mountain View, CA (US)

( * ) Notice: Subject to any disclaimer, the term of this patent is extended or adjusted under 35 U.S.C. 154(b) by 144 days.

(21) Appl. No.: 18/607,345

(22) Filed: Mar. 15, 2024

(65) Prior Publication Data

US 2025/0294345 A1 Sep. 18, 2025

(51) Int. Cl.

| | |
|---|---|
| ***H04W 12/02*** | (2009.01) |
| ***G06F 8/65*** | (2018.01) |
| ***G06F 16/27*** | (2019.01) |
| ***H04W 4/50*** | (2018.01) |
| ***H04W 8/30*** | (2009.01) |

(52) U.S. Cl.
CPC .............. *H04W 12/02* (2013.01); *G06F 8/65* (2013.01); *G06F 16/273* (2019.01); *H04W 4/50* (2018.02); *H04W 8/30* (2013.01)

(58) Field of Classification Search
CPC ......... H04W 12/02; H04W 4/50; H04W 8/30; G06F 8/65; G06F 16/273
See application file for complete search history.

(56) References Cited

U.S. PATENT DOCUMENTS

| | | | | |
|---|---|---|---|---|
| 2005/0237567 | A1* | 10/2005 | Morris | H04N 1/00464 358/1.15 |
| 2016/0292179 | A1* | 10/2016 | von Muhlen | G06F 16/176 |
| 2019/0208014 | A1* | 7/2019 | Goldberg | G06F 16/1767 |
| 2022/0221966 | A1* | 7/2022 | Zionpour | G06F 40/114 |

OTHER PUBLICATIONS

"Git," Retrieved from Internet: https://en.wikipedia.org/wiki/Git, 2023, 22 pages.
"Kafka Streams for Confluent Platform," Retrieved from Internet: https://docs.confluent.io/platform/current/streams/overview.html, 2023, 3 pages.
"Operational transformation," Retrieved from Internet: https://en.wikipedia.org/wiki/Operational_transformation, 2023, 11 pages.

* cited by examiner

*Primary Examiner* — Tan Doan
(74) *Attorney, Agent, or Firm* — IP Spring

(57) ABSTRACT

While a mobile device is not connected to a network, a media application creates a commit that describes changes to be made to entities. The media application determines identifiers associated with the entities. The media application determines whether the entities are resolved or unresolved. The media application transforms the entities that are resolved by applying the changes described in the commit, where a corresponding entity that is unresolved is not transformed until a preceding commit is applied. In response to the mobile device establishing a network connection, the media application transmits the commit to a server for acceptance. Responsive to receiving a notification that the server successfully applied the commit, the media application records an expired version of the commit. Responsive to determining that the server failed to apply the commit, the media application discards the commit.

20 Claims, 7 Drawing Sheets

Media Server 101
Media Application 103a
Database 199
102
Network 105
110
Mobile Device 115n
Media Application 103c
User 125n
108
Mobile Device 115a
Media Application 103b
User 125a

100

| Remote Media 300 | |
|---|---|
| **Column 302** | **Type 304** |
| ID 306 | Dedup Key 308 |
| Proto 310 | Media Item 312 |

FIG 3A

| Media Collection Data 315 | |
|---|---|
| **Column 317** | **Type 319** |
| ID 321 | Local ID 323 |
| Proto 325 | Item Collection Data 327 |

FIG 3B

| Collection 330 | |
|---|---|
| **Column 332** | **Type 334** |
| ID 336 | Local ID 338 |
| Proto 340 | Media Collection 342 |

FIG 3C 400
405
Commit 410
Commit ID 415
Modifying statements 425
Transmission Protocol 450
Modifying statement 425
Read IDs 430
Write IDs 435
Invariants 440
Idempotent transformation functions 445

505

Unresolved State 510

RPC 525

Resolved State 540

#108 (Pending) 515

#107 (Pending) 520

#106 (Success, pending backend #204) 530

#105 (Failed (?), unknown final state) 535

#104 (Failed, backend #201) 545

#103 (Sync, always succeeds, backend #201) 540

#102 (Failed, backend #200) 545

#101 (Success, synced with backend #200) 550

700

While a mobile device is not connected to a network

Create a first commit that describes first changes to be made to first entities 702

Determine the first entities from first identifiers 704

Transform the first entities based on a latest unresolved state by applying the first changes described in the first commit 706

In response to the mobile device establishing a network connection, transmit the first commit to a server for acceptance 708

Responsive to receiving a notification that the server successfully applying the first commit, recording an expired version of the first commit 710

Responsive to determining that the server failed to apply the first commit, discarding the first commit 712

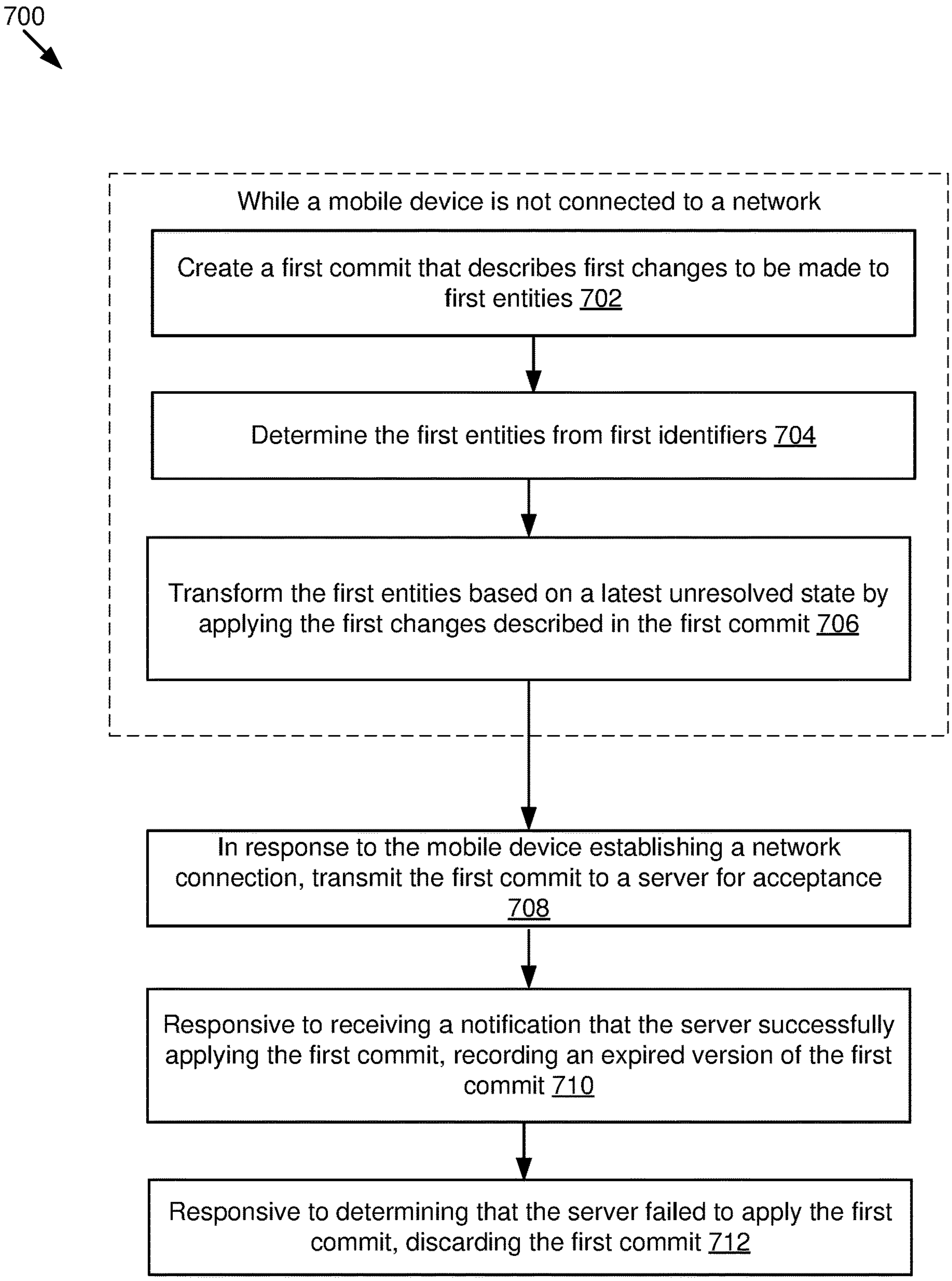

FIG 7

SYNCING MOBILE DEVICE OFFLINE ACTIONS WITH REMOTE SERVERS

BACKGROUND

Applications stored on a mobile device operate against remote data stored remotely in the cloud. Users may make changes to the data in situations where the mobile device has limited or no internet connectivity. The changes to the data persist offline and are transmitted to the cloud when the mobile device regains internet connectivity. Transmitting the changes to the cloud after the mobile device has regained the internet connectivity raises concerns regarding conflict resolution, privacy, and latency.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes while a mobile device is not connected to a network: creating a first commit that describes first changes to be made to first entities; determining the first entities from first identifiers; and determining the first entities from first identifiers. The method further includes in response to the mobile device establishing a network connection, transmitting the first commit to a server for acceptance. The method further includes responsive to receiving a notification that the server successfully applied the first commit, recording an expired version of the first commit. The method further includes responsive to determining that the server failed to apply the first commit, discarding the first commit.

In some embodiments, responsive to the server failing to apply the first commit, the method further includes: identifying the first entities associated with the first commit; identifying a next commit that is affected by the first commit, the next commit describing second changes to be made to second entities; determining second identifiers associated with the second entities; transforming the first entities that are affected by the next commit; transforming the second entities; and transmitting the next commit to the server for acceptance. In some embodiments, the first commit is selected based on being a next oldest commit without read dependency on other commits for acceptance at the server. In some embodiments, the method further includes prior to transmitting the first commit to the server, receiving an update from the server to one of the first entities that is resolved; and reapplying the first changes based on the update. In some embodiments, reapplying the first changes includes: determining a set of entities that are affected by a set of commits; identifying an invariant associated with the set of entities that is no longer met; responsive to a pending commit from the set of commits being associated with the invariant, removing the pending commit from the set of commits; and transforming the set of entities that are resolved by applying remaining changes described in remaining commits from the set of commits. In some embodiments, the first changes are associated with a privacy-sensitive action performed by a user. In some embodiments, the first entities are associated with a media application.

In some embodiments, a non-transitory computer-readable medium with instructions stored thereon that, when executed by one or more computers, cause the one or more computers to perform operations including while a mobile device is not connected to a network: creating a first commit that describes first changes to be made to first entities; determining the first entities from first identifiers; and determining the first entities from first identifiers. The operations further include in response to the mobile device establishing a network connection, transmitting the first commit to a server for acceptance; responsive to receiving a notification that the server successfully applied the first commit, recording an expired version of the first commit; and responsive to determining that the server failed to apply the first commit, discarding the first commit.

In some embodiments, responsive to the server failing to apply the first commit, the operations further include: identifying the first entities associated with the first commit; identifying a next commit that is affected by the first commit, the next commit describing second changes to be made to second entities; determining second identifiers associated with the second entities; transforming the first entities that are affected by the next commit; transforming the second entities; and transmitting the next commit to the server for acceptance. In some embodiments, the first commit is selected based on being a next oldest commit without read dependency on other commits for acceptance at the server. In some embodiments, the operations further includes: prior to transmitting the first commit to the server, receiving an update from the server to one of the first entities that is resolved; and reapplying the first changes based on the update. In some embodiments, reapplying the first changes includes: determining a set of entities that are affected by a set of commits; identifying an invariant associated with the set of entities that is no longer met; responsive to a pending commit from the set of commits being associated with the invariant, removing the pending commit from the set of commits; and transforming the set of entities that are resolved by applying remaining changes described in remaining commits from the set of commits. In some embodiments, the first changes are associated with a privacy-sensitive action performed by a user.

In some embodiments, a system comprises one or more processors and a memory coupled to the one or more processors, with instructions stored thereon that, when executed by the processor, cause the processor to perform operations. The operations include while a mobile device is not connected to a network: creating a first commit that describes first changes to be made to first entities; determining the first entities from first identifiers; and determining the first entities from first identifiers. The operations further include in response to the mobile device establishing a network connection, transmitting the first commit to a server for acceptance; responsive to receiving a notification that the server successfully applied the first commit, recording an expired version of the first commit; and responsive to determining that the server failed to apply the first commit, discarding the first commit. In some embodiments, the first entities are associated with a media application.

In some embodiments, responsive to the server failing to apply the first commit, the operations further include: identifying the first entities associated with the first commit; identifying a next commit that is affected by the first commit, the next commit describing second changes to be made to second entities; determining second identifiers associated with the second entities; transforming the first entities that are affected by the next commit; transforming the second entities; and transmitting the next commit to the server for acceptance. In some embodiments, the first commit is selected based on being a next oldest commit without read dependency on other commits for acceptance at the server. In some embodiments, the operations further includes: prior to transmitting the first commit to the server, receiving an update from the server to one of the first entities that is resolved; and reapplying the first changes based on the update. In some embodiments, reapplying the first changes includes: determining a set of entities that are affected by a set of commits; identifying an invariant associated with the set of entities that is no longer met; responsive to a pending commit from the set of commits being associated with the invariant, removing the pending commit from the set of commits; and transforming the set of entities that are resolved by applying remaining changes described in remaining commits from the set of commits. In some embodiments, the first changes are associated with a privacy-sensitive action performed by a user.

BRIEF DESCRIPTION OF THE DRAWINGS

FIGS. 3A-C illustrate example key-value table definitions of remote metadata stored on a mobile device, according to some embodiments described herein.

FIG. 7 illustrates an example flowchart of a method to synchronize a commit at a mobile device and a server, according to some embodiments described herein.

DETAILED DESCRIPTION

Applications stored on a mobile device operate against remote data stored remotely in the cloud. Users may make changes to the data in situations where the mobile device has limited or no internet connectivity. The changes to the data persist offline and are transmitted to the cloud when the mobile device regains internet connectivity. Transmitting the changes to the cloud after the mobile device has regained internet connectivity raises concerns regarding conflict resolution, privacy, and latency.

A conflict resolution problem arises when multiple users make conflicting changes offline to the same data. For example, if two users change the title of the same photo, the photo application only accepts one of the changes. The photo application may accept the most recent change or the oldest change, which is perceived by a user with the change that was not accepted as data loss.

A privacy issue arises if certain preceding offline changes were not successfully transmitted to the cloud. For example, if a user edits a photo offline and shares the photo with another user, the photo edit may fail during transmission (e.g., due to a conflict), and the user may share the photo in an unintended state.

A latency issue arises when offline changes are delayed before being transmitted to the cloud because processing the changes may take some additional time. This is exacerbated when multiple users make conflicting changes offline to the same data because the conflict resolution takes longer to process.

A media application addresses the problems above by establishing a persistence queue storage on the mobile device that contains a series of offline commits. The media application creates and enqueues a commit for each user action that modifies the remote data. The media application manages synchronization of the remote data with entities stored on a server by ensuring that preconditions are met on the mobile device before transmitting the commit to the server for synchronization. In addition, if updates are transmitted from the server to the mobile device, the media application updates the affected entities and resolves conflicts by transforming the entities on the mobile device before transmitting commits to the server. Lastly, if the server rejects a commit, the media application determines which entities depend on the commit and resolves the conflicts by removing commits where invariants are no longer met and transforms affected entities on the mobile device.

Example Environment 100

Figure 1:
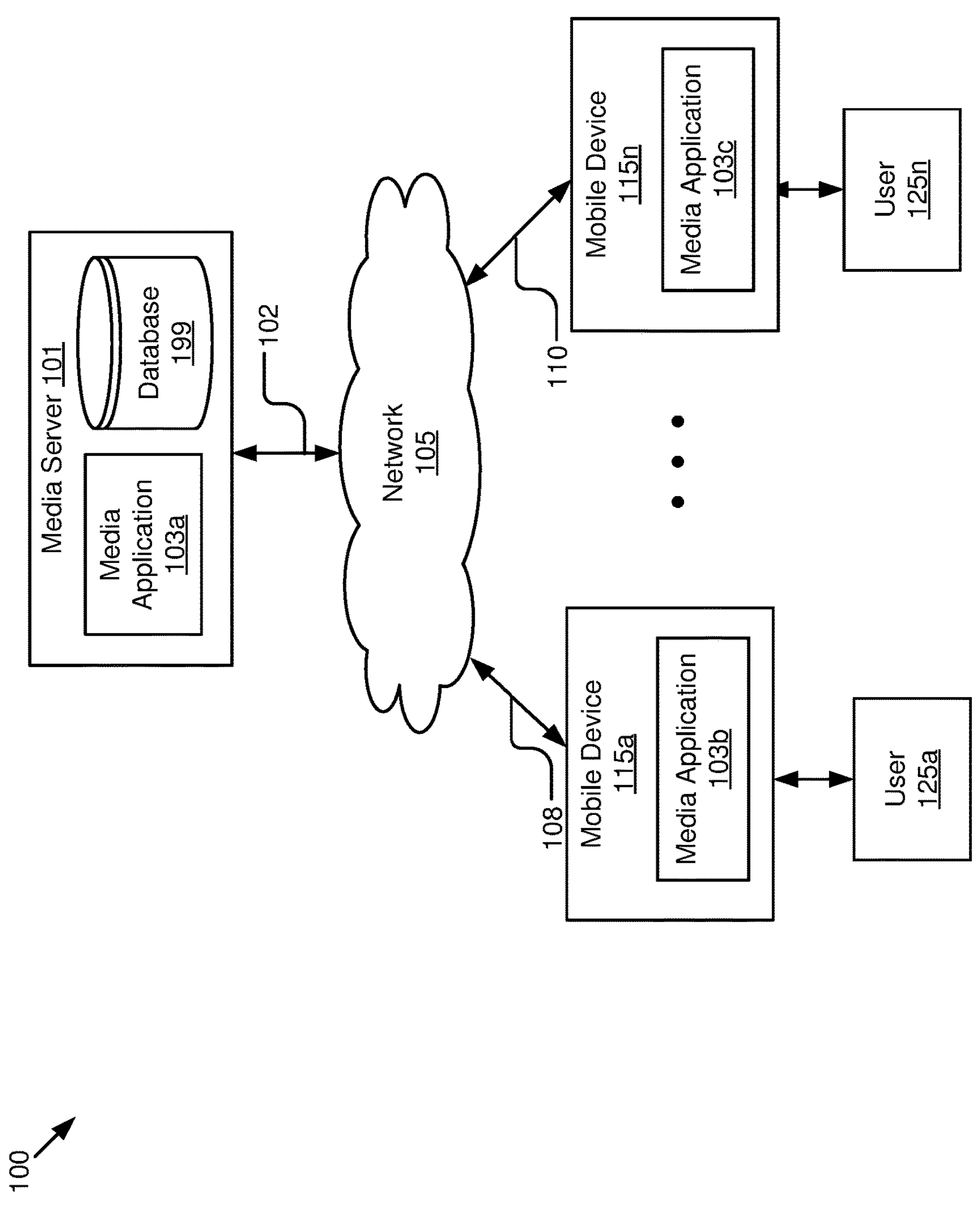
FIG. 1 is a block diagram of an example network environment, according to some embodiments described herein.

FIG. 1 illustrates a block diagram of an example environment 100 to manage synchronization of user actions. In some embodiments, the environment 100 includes a media server 101, a mobile device 115*a*, and a mobile device 115*n* coupled to a network 105. Users 125*a*, 125*n* may be associated with respective mobile devices 115*a*, 115*n*. In some embodiments, the environment 100 may include other servers or devices not shown in FIG. 1. In FIG. 1 and the remaining figures, a letter after a reference number, e.g., "115*a*," represents a reference to the element having that particular reference number. A reference number in the text without a following letter, e.g., "115," represents a general reference to embodiments of the element bearing that reference number.

The media server 101 may include a processor, a memory, and network communication hardware. In some embodiments, the media server 101 is a hardware server. The media server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the media server 101 sends and receives data to and from one or more of the mobile devices 115*a*, 115*n* via the network 105. The media server 101 may include a media application 103*a* and a database 199.

The database 199 may have a commit log of user actions, media, etc. The database 199 may also store social network data associated with users 125, user preferences for the users 125, etc.

The mobile device 115 may be a computing device that includes a memory coupled to a hardware processor. For example, the mobile device 115 may include a mobile device, a tablet computer, a mobile telephone, a wearable device, a head-mounted display, a mobile email device, a portable game player, a portable music player, a reader device, or another electronic device capable of accessing a network 105.

In the illustrated implementation, mobile device 115*a* is coupled to the network 105 via signal line 108 and mobile device 115*n* is coupled to the network 105 via signal line 110. The media application 103 may be stored as media application 103*b* on the mobile device 115*a* and/or media application 103*c* on the mobile device 115*n*. Signal lines 108 and 110 may be wired connections, such as Ethernet, coaxial cable, fiber-optic cable, etc., or wireless connections, such as Wi-Fi®, Bluetooth®, or other wireless technology. Mobile devices 115*a*, 115*n* are accessed by users 125*a*, 125*n*, respectively. The mobile devices 115*a*, 115*n* in FIG. 1 are used by way of example. While FIG. 1 illustrates two mobile devices, 115*a* and 115*n*, the disclosure applies to a system architecture having one or more mobile devices 115.

The media application 103 may be stored on the media server 101 or the mobile device 115. In some embodiments, the operations described herein are performed on the media server 101 or the mobile device 115. In some embodiments, some operations may be performed on the media server 101 and some may be performed on the mobile device 115. Performance of operations is in accordance with user settings. For example, the user 125*a* may specify settings that operations are to be performed on their respective device 115*a* and not on the media server 101. With such settings, operations described herein are performed entirely on mobile device 115*a* and no operations are performed on the media server 101. Further, a user 125*a* may specify that images and/or other data of the user is to be stored only locally on a mobile device 115*a* and not on the media server 101. With such settings, no user data is transmitted to or stored on the media server 101. Transmission of user data to the media server 101, any temporary or permanent storage of such data by the media server 101, and performance of operations on such data by the media server 101 are performed only if the user has agreed to transmission, storage, and performance of operations by the media server 101. Users are provided with options to change the settings at any time, e.g., such that they can enable or disable the use of the media server 101.

In some embodiments, the media application 103*b* may be implemented using hardware including a central processing unit (CPU), a field-programmable gate array (FPGA), an application-specific integrated circuit (ASIC), machine learning processor/co-processor, any other type of processor, or a combination thereof. In some embodiments, the media application 103*a* may be implemented using a combination of hardware and software.

While the mobile device 115 is not connected to the network 105, the media application 103*b* creates a first commit that describes first changes to be made to first entities, determines first entities from first identifiers, and determining the first entities from first identifiers. In response to the mobile device establishing a network connection, the media application 103*b* transmits the first commit to the media server 101 for acceptance. Responsive to the media server 101 successfully applying the first commit, the media application 103*b* records an expired version of the first commit. Responsive to the media server 101 failing to apply the first commit, the media application 103*b* discards the first commit.

Example Computing Device 200

Figure 2:
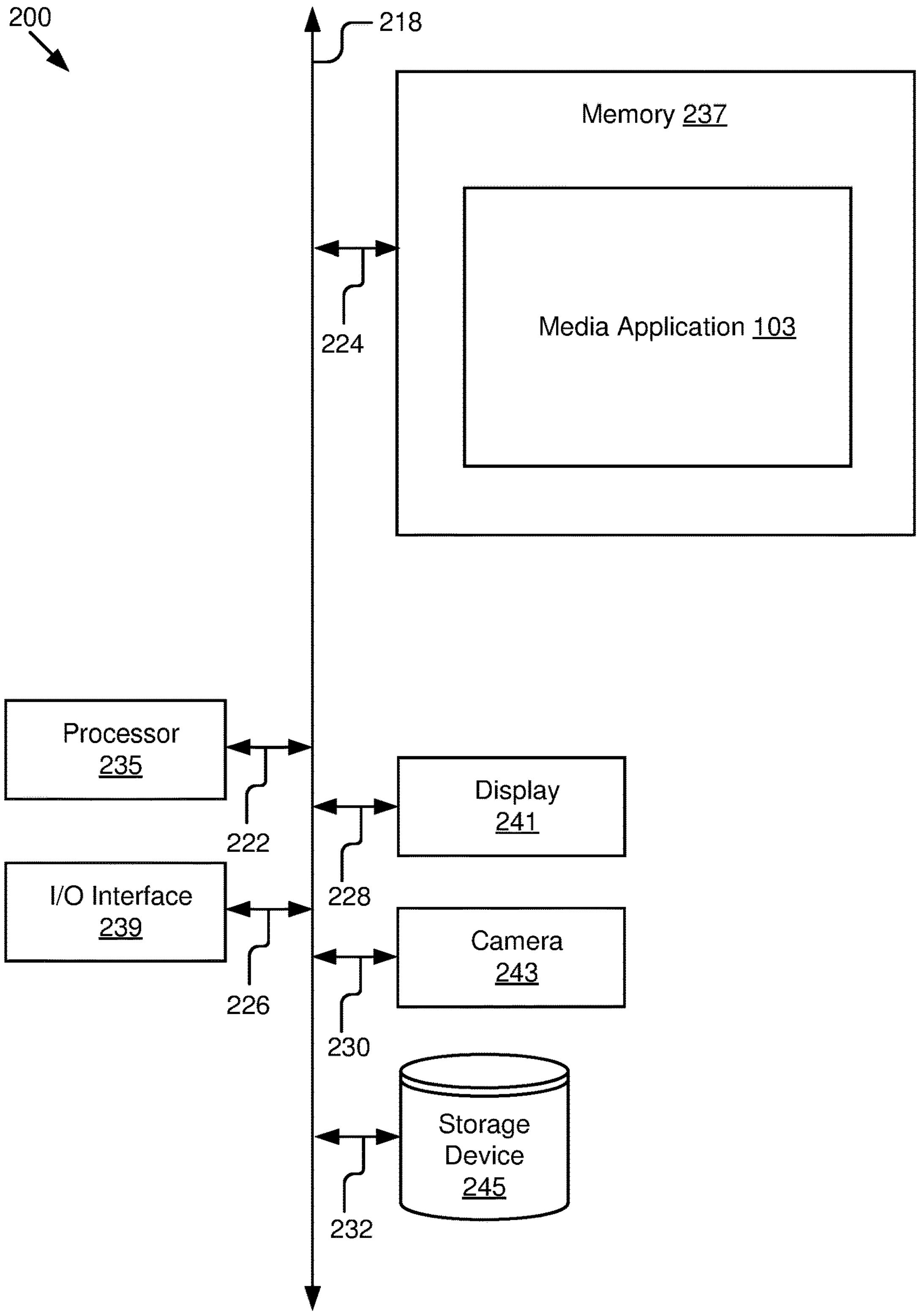
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In one example, computing device 200 is media server 101 used to implement the media application 103*a*. In another example, computing device 200 is mobile device 115 used to complement the media application 103*b*.

In some embodiments, computing device 200 includes a processor 235, a memory 237, an input/output (I/O) interface 239, a display 241, a camera 243, and a storage device 245, all coupled via a bus 218. The processor 235 may be coupled to the bus 218 via signal line 222, the memory 237 may be coupled to the bus 218 via signal line 224, the I/O interface 239 may be coupled to the bus 218 via signal line 226, the display 241 may be coupled to the bus 218 via signal line 228, the camera 243 may be coupled to the bus 218 via signal line 230, and the storage device 245 may be coupled to the bus 218 via signal line 232.

Processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 235 may include one or more co-processors that implement neural-network processing. In some embodiments, processor 235 may be a processor that processes data to produce probabilistic output, e.g., the output produced by processor 235 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 237 is typically provided in computing device 200 for access by the processor 235, and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including a media application 103.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 245), and input/output devices can communicate via I/O interface 239. In some embodiments, the I/O interface 239 can connect to interface devices such as input devices (keyboard, pointing device, touchscreen, microphone, scanner, sensors, etc.) and/or output devices (display devices, speaker devices, printers, monitors, etc.).

Some examples of interfaced devices that can connect to I/O interface 239 can include a display 241 that can be used to display content, e.g., images, video, and/or a user interface of an output application as described herein, and to receive touch (or gesture) input from a user. Display 241 can include any suitable display device such as a liquid crystal display (LCD), light emitting diode (LED), or plasma display screen, cathode ray tube (CRT), television, monitor, touchscreen, three-dimensional display screen, or other visual display device. For example, display 241 can be a flat display screen provided on a mobile device, multiple display screens embedded in a glasses form factor or headset device, or a monitor screen for a computer device.

Camera 243 may be any type of image capture device that can capture images and/or video. In some embodiments, the camera 243 captures images or video that the I/O interface 239 transmits to the media application 103.

The storage device 245 stores data related to the media application 103. For example, the storage device 245 may store remote metadata that includes key-value tables, a commit log of user actions, etc. The storage device 245 may also include media, a user profile that describes user preferences, etc.

FIGS. 3A-C illustrate example key-value table definitions of remote metadata stored on a mobile device. FIG. 3A illustrates a table for remote media 300 definitions. The remote media 300 includes a column 302 and a type 304. The first row under the headers includes an identifier (ID) 306 for a duplication detection key (Dedup Key) 308. The Dedup Key 308 is a binary hash of media. The second row includes proto 310 for a Media Item 312. The Media Item 312 is a binary object in Protocol Buffers, which is a data format used to serialize structured data.

FIG. 3B illustrates a table for media collection data 315 definitions and includes a column 317 and a type 319. The first row under the header includes an ID 321 and a Local ID 323. The second row includes proto 325 for item collection data 327.

FIG. 3C illustrates a table for collection 330 definitions and includes a column 332 and a type 334. The first row under the header includes an ID 336 and a Local ID 338. The second row includes proto 340 for a Media Collection 342. The Media Collection 342 is a protocol buffer representation of a collection's metadata.

The media application 103 normalizes the tables. A change made to one row does not result in the change being propagated to other rows. Each table has a primary key and a proto/value column. The mobile device generates the primary key IDs while the mobile device is offline. The tables are views of the underlying source of truth, which is embodied in the commit log.

A list of all changes made to a media item may be aggregated into a table and memorialized as a media item, such as the Media Item 312 stored in the remote media 300 table. Changes made to the media item are referred to as a commit. A commit describes the smallest difference that captures the user intent embodied in a user action. For example, if a user indicates that a photo is a favorite, the user action is serialized with a SET_FAVORITE commit. By minimizing the description in the commit, the commit minimizes conflicts with other commit logs (e.g., the commit log maintained at the media server) and increases the likelihood of maintaining backward compatibility.

Figure 4:
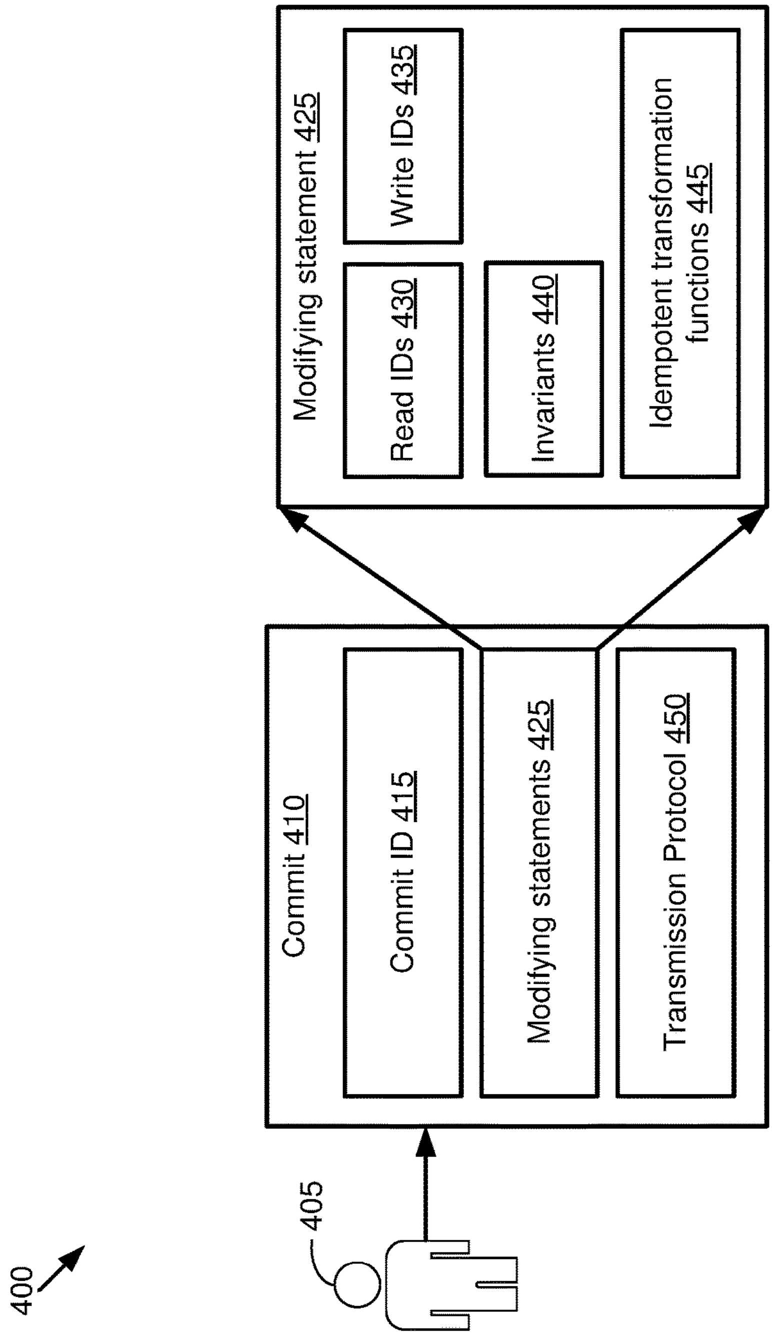
FIG. 4 is an example illustration of a commit, according to some embodiments described herein.

FIG. 4 is an example illustration 400 of a commit 410. A user 405 performs a user action that is described by a commit 410. The commit 410 may include a commit ID 415, a snapshot 420, modifying statements 425, and a transmission protocol 450.

A commit ID 415 identifies a particular action being performed, such as the SET_FAVORITE action mentioned above. A modifying statement 425 includes read IDs 430 of read entities that are to be read in order to apply the mutation, write IDs 435 of write entities to be modified (mutated), invariants 440 (preconditions) of the read entities that are to be met before applying the mutation, and idempotent transformation functions 445 on entities. The invariant conceptually contains what the essence of the action is and what the user expects of the action at the time. The invariant may contain one or more attributes of the entities, one or more version numbers, and/or one or more hashes of the one or more attributes of the entities.

The idempotent transformation functions 445 are used to re-apply the commit on the same input to achieve the same output. As a result of the idempotent transformation functions 445, the media application 103 can derive the tables illustrated in FIG. 3 from an aggregated application of the commits and rebuild the tables at any version of a commit log, such as the commit log illustrated in FIG. 5. The consistency of the idempotent transformation functions increases when the commit reads and writes from the same database. The transmission protocol 450 describes how to transmit the commit 410 to the media server.

The modifying statement 425 is associated with an entity definition. The entity definition contains instructions for how to apply the most recent synchronization from the media server of a transformation to obtain a resolved state. The transformed entity may be visible to users to reflect the changes made in response to the user action. The read IDs 430 and the write IDs 435 are associated with entity IDs and/or index IDs. modifying statement 425 may be associated with an entity index, where the entity index may be resolved to one or more entity IDs during queue computation in response to either synchronization or a user action. The entity index allows the modifying statement 425 to mutate multiple entities using a single index ID.

In some embodiments, the commit 410 includes the modifying statements 425 and the transmission protocol 450, but omits the commit ID 415.

Figure 5:
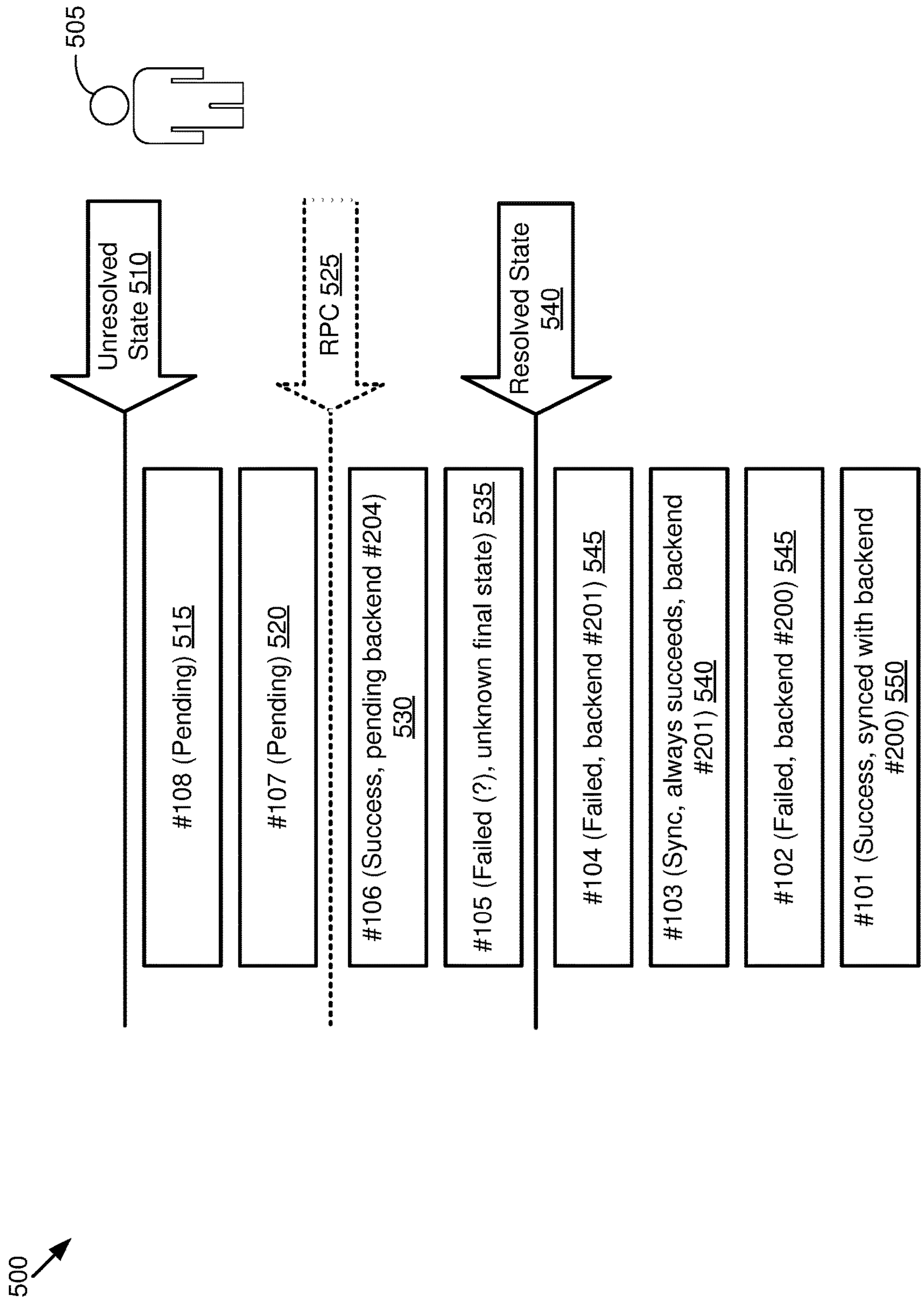
FIG. 5 illustrates an example commit log that includes an unresolved state and a resolved state, according to some embodiments described herein.

FIG. 5 illustrates an example commit log 500 that includes an unresolved state 510 and a resolved state 540. The unresolved state 510 (also known as a dirty state) includes pending commits that are not yet synchronized with the media server. The resolved state 540 (also known as a pristine state) represents the last known entity state of the media server. Successful commits below the resolved state 540 have received a response from the media server after the modification. Failed commits below the resolved state 540 have received a response from the media server rejecting the commit. The resolved state 540 moves up the queue as the queue receives confirmation from the media server that a commit was successfully applied.

The remote procedure call (RPC) 525 represents a point at which the mobile device transmits a commit to the media server. In some embodiments, the RPC 525 is idempotent, such that the media application 103 can replay the commit and yield the same final result. The RPC 525 moves up the queue as each commit is transmitted to the media server.

Each item under the unresolved state 510 and the resolved state 540 represents a commit. Each commit is associated with a number. For example, #108 is a pending commit 515 that is part of the unresolved state. Some commits include invariants, which are preconditions that must be satisfied before the commit is accepted. An example of a commit that is an invariant of another commit may include when a user edits an image and then adds the image to a photo album. The edit to the image must be accepted before the image can be added to the photo album because the user's intent was not to have the unedited version of the image added to the photo album.

Synchronizing Transactions with a Media Server

When a user performs a user action and the mobile device is offline, for example, because the mobile device is not connected to a network, the media application 103 creates a commit. The commit may be a first commit that describes first changes to be made to first entities. The first commit may include modifying statements with read IDs, write IDs, invariants, and idempotent transformation functions. The media application 103 adds the commit to the end of a commit log, such as the commit log illustrated in FIG. 5. The commit log may be a queue, a stack, etc.

The media application 103 determines the first entities from first identifiers. The first identifiers may include read IDs and write IDs associated with the first entities. The media application 103 uses the identifiers to determine the status of the first entities (e.g., through a query). For example, a first commit may not be able to move from an unresolved state to a resolved state until a preceding entity associated with a preceding commit succeeds and the preceding commit is applied by moving from the unresolved state to the resolved state. In some embodiments, the media application 103 determines the entity IDs from the read IDs, the write IDs, and/or the index IDs.

For new commits, the media application 103 transforms the first entities based on a latest unresolved state by applying the first changes described in the first commit. For example, the latest unresolved state 510 in FIG. 5 is commit 515.

For commits that are not new, the media application 103 transforms the first entities that are resolved by applying the first changes described in the first commit. The media application 103 stores the transformed entities at the mobile device. For example, the transformed entities may be stored via an entity definition. Once the transformed entity is stored, the change associated with the transformed entity is visible to users. For example, if the transformed entity is for marking an image as a favorite image, storing the transformed entity results in a favorite icon becoming visible to the user.

Once the mobile device is online, for example, because the mobile device establishes a network connection with the media server, commits are transmitted to a media server for synchronization. In some embodiments, a next oldest commit that does not have a read entity dependency on any pending commit is transmitted first. A commit is transmitted to the media server through a remote procedure call, an external process, etc. The remote procedure call may perform an invariant check to avoid race conditions where different devices try to submit commits at the same time. Commits may be transmitted asynchronously. In some embodiments, once a first commit is transmitted, the media application 103 identifies a second commit that is eligible for transmission and continues the process until the commits in the unresolved state are exhausted.

If the media server successfully applies the commit, the media application 103 receives a confirmation that the commit was accepted and records an expired version of the commit. The entities that are transformed by the commit at the media server are saved as part of the resolved state. For example, in FIG. 5, once the media application 103 receives confirmation that commit 530 was accepted, commit 530 moves below the resolved state 540 line.

The media server may fail to apply a commit in two ways. First, the media server may explicitly reject a commit and transmit a rejection to the mobile device. In some embodiments, the media application 103 identifies the commit as a failed commit in the commit log as part of the resolved state 540, such as commit 545 in FIG. 5. Second, the mobile device may not receive a response from the media server and instead determines that the commit failed based on exceeding a number of retry attempts, exceeding a timeout period, etc. The media application 103 may mark the commit as a failed commit or show the commit as having an intermediate unknown state while a final resolution is determined. For example, commit 535 illustrates an example where a commit is in an unknown final state. Once the final resolution is determined, the commit is updated as a failed commit, such as commit 545, or the commit is updated as a successful commit, such as commit 550 as part of the resolved state 540.

If the media application 103 determines that the media server failed to apply the commit, the media application 103 discards the changes to be implemented with the commit and reverses any changes that were made visible. Because the commit may affect other commits, the media application 103 determines whether other commits are to be removed or kept in a reapplication process. Other commits are to be removed when invariants are no longer met as a result of the failure to apply a commit.

In some embodiments, the media application 103 performs the reapplication process by identifying the initial set of affected entities and the starting commit. For example, the media application 103 identifies the first entities associated with the first commit that were to be modified. The media application 103 identifies a next oldest commit that is affected by (i.e., read entities changed by) the first commit or affects (i.e., writes to entities changed by) the first commit, where the next commit describes second changes to be made to second entities. The media application 103 determines second identifiers associated with the second entities. The media application 103 transforms the first entities that are affected by the next commit and transforms the second entities. The next commit is then transmitted to the media server for acceptance. The next commit may be transmitted to the media server at or around the same time as the application process or at a different time.

During the online period, the mobile device also receives updates from the media server about changes made to resolved entities. In some embodiments, the updates are applied to entities before a commit is transmitted to a media server for synchronization. Otherwise, the commit may be outdated and is more likely to be rejected by the media server since the commit may have an entity description that conflicts with an entity description maintained by the media server. When the media device receives an update to an entity, the media application 103 reapplies pending changes based on the update.

In some embodiments, the media application 103 reapplies pending changes based on the update by determining a set of entities that are affected by a set of commits. The set of commits may be a single commit being updated or multiple commits that are being updated. The media application 103 starts with the oldest commit in the set of commits. The media application 103 identifies the next oldest commit that is affected by or affects the entities being updated. For example, the media application 103 may compare the entity IDs of the entities being updated to the entity IDs or the index IDs that are described in the modifying statements. The media application 103 may retrieve additional read entities that are described in the modifying statements. In some embodiments, the media application 103 may transform the additional read entries based on modifying statements associated with preceding commits before the next step.

The media application 103 identifies invariants associated with the set of entities that are no longer met. For example, if a first commit was related to a user action for sharing a media item, but the update included a second commit from another user for a user action for deleting the media item, there is no longer a media item to share and the first commit invariant is no longer valid. The media application 103 does not transmit the first commit to the media server 101 because the first commit has already failed at the media device 115. In situations where a commit fails, the media application 103 may notify the user that the user action failed and ask the user to perform the user action again.

Responsive to a pending commit from the set of commits being associated with the invariant, removing the pending commit from the set of commits. Continuing with the example above, the media application 103 may move the pending commit for sharing the media item from the unresolved state 510 to the resolved state 540 and identify the commit as a failed commit. The media application 103 identifies pending entities associated with the pending commit and adds the pending entities to the set of entities for later processing.

The above steps are repeated until the set of entities have been processed and are resolved. The media application 103 transforms the set of entities that are resolved, i.e., the set of entities that are not still waiting to be transformed, by applying the changes described in remaining commits from the set of commits. The above steps are repeated for the remaining set of commits. Once the transformed entities are stored, the changes made by the user are visible. For example, if the user edited an image, the edits to the image are made visible.

Example Use Cases

In some embodiments, the steps described above also apply to user actions that are performed online. This may include actions at a mobile device where the mobile device is online, user actions performed on a client device (e.g., a desktop application) using a browser-based application, etc.

Figure 6:
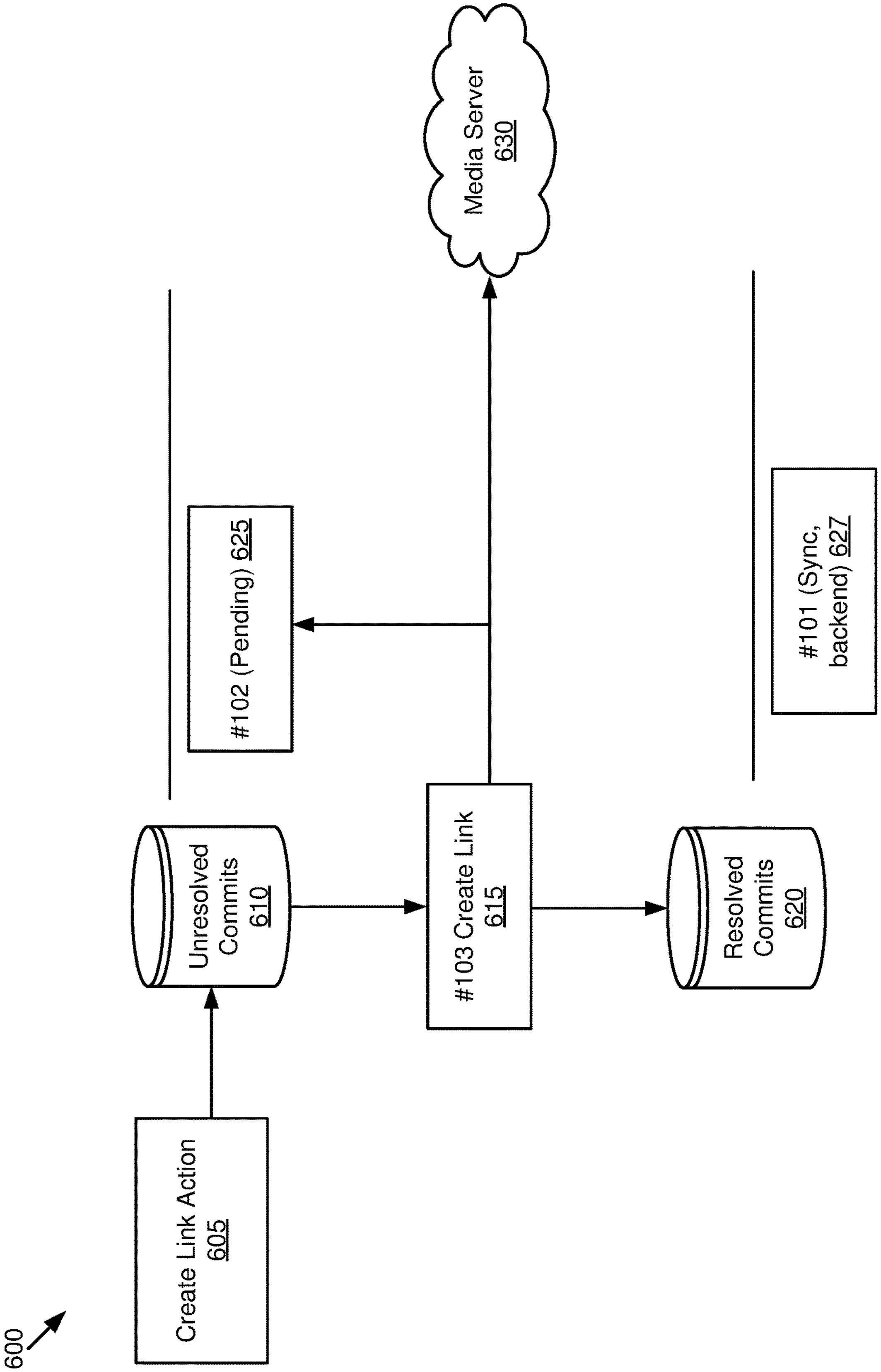
FIG. 6 illustrates an example process of how an online action is recorded as a commit by a mobile device and a media server, according to some embodiments described herein.

FIG. 6 illustrates an example process 600 of how an online action is recorded as a commit by a mobile device and a media server. In this example, a user action is to create a shared album that generates an album link for third-party applications. The user action is embodied in the create link action 605. The create link action is executed against a database of unresolved commits 610 to create a create link 615 commit. The create link 615 commit includes an invariant snapshot that contains current images in the album. The media application 103 tries to apply the create link 615 commit against the database of resolved commits 620 and validate invariants of and pending commits. For example, the create link 615 commit is compared to the #102 (Pending) commit 625.

The database of resolved commits 620 or the media server 630 may reject the create link 615 commit for several reasons. For example, the create link 615 commit invariant may fail when compared to the database of resolved commits 620 because one of the photos in the photo album may be pending upload and does not yet exist in the database of resolved commits 620. In another example, the create link 615 commit breaks a pending commit invariant where SAVE_EDIT has a default happens-before invariant and the user initiated create link is after SAVE_EDIT. By applying the create link 615 commit, the invariant breaks. Lastly, the create link 615 commit may fail against the media server 630 because one of the photos to be shared was edited by another user, which creates an inherent conflict about whether the photo to be shared in the album is the photo without the edit or with the edit.

If successful, the create link 615 commit is executed against the media server 630. If the media server 630 accepts the create link 615 commit, the create link 615 commit is saved to the database of resolved commits 620 as successful along with the #101 (Sync, backend) 627 commit.

In situations where a user action has privacy-sensitive implications, the media application 103 may validate the invariants before approving the commit. For example, if the user action is to share a media item, the media server rejects the commit for sharing the media item if the entities associated with the media item do not match. For example, if the commit for the media item includes entities that differ from the resolved state at the media server that describe features, such as the edits, trash state, and IDs associated with the media item, the media server may reject the commit. Conversely, if a user action is to revoke sharing of a media item, the invariant of an unshare action may always be accepted by the media server because it preserves the user's privacy and any discrepancies between the commit from the media device and the resolved state at the media server are not confirmed.

The media application solves the problem of conflict resolution by using a transform function that minimizes a change made to the entity. This principle minimizes the likelihood that two changes come into conflict. In cases where conflicts affect the same entity attributes, the media application includes an option to configure user preferences for specifying a last written win strategy where the transform is always applied, a first write win strategy where the transform is applied if the pre-transformed value is the same, or an in-between determination. For example, user A edits an image by cropping the image. Afterwards, user B edits the image by adding text to the image. In a last written strategy, user B's text would be added to the image and user A's crop would be rejected. In a first write win strategy, the image is modified with user A's crop and user B's text would be rejected. An in-between determination might include accepting both edits if they do not directly interfere with each other. For example, if the crop does not overlap with where the text is added, the image may be modified with both edits without a conflict.

The media application solves the problem of privacy by using the invariant concept to ensure that privacy-sensitive multi-user actions operate on the state expected by the user. If a photo edit fails, the share commit invariant detects that the photo is not in the state as it was at the time of the user action.

The media application solves the problem of latency by discriminating between read entities upon which a commit depends and write entities that the commit modifies. The queue uses the dependency information to transmit the commit out of order, which reduces the transmission latency, while yielding consistent results for the user. The reapplication process allows updates from the media server to be synced to the media device with pending commit changes efficiently incorporated without waiting for the queue to be emptied.

Example Method 700

FIG. 7 illustrates an example flowchart of a method 700 to synchronize a commit at a mobile device and a server. The method 700 may be performed by the computing device 200 in FIG. 2. In some embodiments, the method 700 is performed by the mobile device 115.

The method 700 of FIG. 7 may begin at block 702. At block 702, while a mobile device is not connected to a network, a first commit is created that describes first changes to be made to first entities. For example, the changes may include an edit made to a video, sharing an image, creating a photo album, etc. The first changes may be associated with a privacy-sensitive action performed by a user. The first entities may be associated with a media application. Block 702 may be followed by block 704.

At block 704, the first entities are determined from first identifiers. If a media application has already identified the set of entities to be modified, the first commit may be created using entity IDs that are associated with the first entities. For example, if the first commit involves the creation of a photo album, the commit may involve an entity for each media item in the photo album. If the media application has not yet identified the set of entities to be modified, the media application may identify the set of entities from the index key, which represents the criteria for finding the entities to be modified. For example, an example of a commit with usage of an index is favorite by dedup key. When a user selects a media item copy with a dedup key, the media application finds all media item copies for the dedup key and marks the media items as favorited. The first identifiers may include write IDs for the entities to be modified and read IDs for the entities that have invariants that are preconditions to be met before applying the commit. Block 704 may be followed by block 706.

At block 706, the first entities are transformed based on a latest unresolved state by applying the changes described in the first commit. For example, the latest unresolved state is the commit at the end (top) of the queue. Block 706 may be followed by block 708.

At block 710, in response to the mobile device establishing a network connection, the first commit is transmitted to a server for acceptance. For example, the first commit may be transmitted via an RPC. Block 710 may be followed by block 712.

At block 712, responsive to receiving a notification that the server successfully applied the first commit, an expired version of the first commit is recorded. For example, in a commit log, the first commit is moved from being associated with unresolved commits to being associated with resolved commits. The notification may be an RPC response and the RPC response may contain one or more expired versions, which is the first entity's version that should contain the applied first commit. There may be one expired version for the entire first commit or one expired version for each first entity changed by the first commit. In some instances where the mobile device experiences an issue with bandwidth or latency or the media server needs additional time to apply the first commit, the RPC response may not include the updated first entity. In some embodiments, a separate synchronization process may fetch changes from the media server where the changes are beyond the expired version (e.g., the expired version of the first entity is fetched). In this situation, the first commit is resolved.

In some embodiments, the first commit may be selected based on being a next oldest commit without read dependency on other commits for acceptance at the server.

In some embodiments, prior to transmitting the first commit to the server, an update is received from the server to one of the first entities that is resolved. First changes are reapplied based on the update, which may include: determining a set of entities that are affected by a set of commits; identifying an invariant associated with the set of entities that is no longer met; responsive to a pending commit from the set of commits being associated with the invariant, removing the pending commit from the set of commits; and transforming the set of entities that are resolved by applying the changes described in remaining commits from the set of commits.

At block 714, responsive to determining that the server failed to apply the first commit, the first commit is discarded. In some embodiments, the method further includes identifying the first entities associated with the first commit; identifying a next commit that is affected by the first commit, the next commit describing second changes to be made to second entities; determining second identifiers associated with the second entities; transforming the first entities that are affected by the next commit; transforming the second entities; and transmitting the next commit to the server for acceptance.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMS, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:

while a mobile device is not connected to a network:
- creating a plurality of commits, the plurality of commits including a first commit that describes first changes to be made to first entities;
- determining the first entities from first identifiers; and
- transforming the first entities based on a latest unresolved state by applying the first changes described in the first commit;

in response to the mobile device establishing a network connection, selecting the first commit for acceptance at a server before other commits from the plurality of commits based on the first commit being a next oldest commit without read dependency on the other commits;

transmitting the first commit to the server for acceptance;

responsive to receiving a notification that the server successfully applied the first commit, recording an expired version of the first commit; and responsive to determining that the server failed to apply the first commit, discarding the first commit.

2. The method of claim 1, wherein responsive to the server failing to apply the first commit, the method further includes:

identifying the first entities associated with the first commit;

identifying a next commit of the plurality of commits that is affected by the first commit, the next commit describing second changes to be made to second entities;

determining second identifiers associated with the second entities;

transforming the first entities that are affected by the next commit;

transforming the second entities; and transmitting the next commit to the server for acceptance.

3. The method of claim 1, wherein prior to receiving the notification that the server successfully applied the first commit, the method further includes:

marking the first commit as having an intermediate unknown state while a final resolution is determined.

4. The method of claim 1, further comprising prior to transmitting the first commit to the server, receiving an update from the server to one of the first entities that is resolved; and reapplying the first changes based on the update.

5. The method of claim 4, wherein reapplying the first changes includes:

determining a set of entities that are affected by a set of commits;

identifying an invariant associated with the set of entities that is no longer met;

responsive to a pending commit from the set of commits being associated with the invariant, removing the pending commit from the set of commits; and transforming the set of entities that are resolved by applying remaining changes described in remaining commits from the set of commits.

6. The method of claim 1, wherein the first changes are associated with a privacy-sensitive action performed by a user.

7. The method of claim 1, wherein the first entities are associated with a media application.

8. A non-transitory computer-readable medium with instructions stored thereon that, when executed by one or more computers, cause the one or more computers to perform operations, the operations comprising:

while a mobile device is not connected to a network:
- creating a plurality of commits, the plurality of commits including a first commit that describes first changes to be made to first entities;
- determining the first entities from first identifiers; and transforming the first entities based on a latest unresolved state by applying the first changes described in the first commit;

in response to the mobile device establishing a network connection, selecting the first commit for acceptance at a server before other commits from the plurality of commits based on the first commit being a next oldest commit without read dependency on the other commits;

transmitting the first commit to the server for acceptance;

responsive to receiving a notification that the server successfully applied the first commit, recording an expired version of the first commit; and responsive to determining that the server failed to apply the first commit, discarding the first commit.

9. The non-transitory computer-readable medium of claim 8, wherein responsive to the server failing to apply the first commit, the operations further include:

identifying the first entities associated with the first commit;

identifying a next commit of the plurality of commits that is affected by the first commit, the next commit describing second changes to be made to second entities;

determining second identifiers associated with the second entities;

transforming the first entities that are affected by the next commit;

transforming the second entities; and transmitting the next commit to the server for acceptance.

10. The non-transitory computer-readable medium of claim 8, prior to determining that the server failed to apply the first commit, the operations further includes:

marking the first commit as having an intermediate unknown state while a final resolution is determined.

11. The non-transitory computer-readable medium of claim 8, wherein the operations further includes:

prior to transmitting the first commit to the server, receiving an update from the server to one of the first entities that is resolved; and reapplying the first changes based on the update.

12. The non-transitory computer-readable medium of claim 11, wherein reapplying the first changes includes:

determining a set of entities that are affected by a set of commits;

identifying an invariant associated with the set of entities that is no longer met;

responsive to a pending commit from the set of commits being associated with the invariant, removing the pending commit from the set of commits; and transforming the set of entities that are resolved by applying remaining changes described in remaining commits from the set of commits.

13. The non-transitory computer-readable medium of claim 8, wherein the first changes are associated with a privacy-sensitive action performed by a user.

14. The non-transitory computer-readable medium of claim 8, wherein the first entities are associated with a media application.

15. A system comprising:

a processor; and a memory coupled to the processor, with instructions stored thereon that, when executed by the processor, cause the processor to perform operations comprising:

while a mobile device is not connected to a network:

creating a plurality of commits, the plurality of commits including a first commit that describes first changes to be made to first entities;

determining the first entities from first identifiers; and transforming the first entities based on a latest unresolved state by applying the first changes described in the first commit;

in response to the mobile device establishing a network connection, selecting the first commit for acceptance at a server before other commits from the plurality of commits based on the first commit being a next oldest commit without read dependency on the other commits;

transmitting the first commit to the server for acceptance;

responsive to receiving a notification that the server successfully applied the first commit, recording an expired version of the first commit; and responsive to determining that the server failed to apply the first commit, discarding the first commit.

16. The system of claim 15, wherein responsive to the server failing to apply the first commit, the operations further include:

identifying the first entities associated with the first commit;

identifying a next commit of the plurality of commits that is affected by the first commit, the next commit describing second changes to be made to second entities;

determining second identifiers associated with the second entities;

transforming the first entities that are affected by the next commit;

transforming the second entities; and transmitting the next commit to the server for acceptance.

17. The system of claim 15, wherein prior to receiving the notification that the server successfully applied the first commit, the operations further includes:

marking the first commit as having an intermediate unknown state while a final resolution is determined.

18. The system of claim 15, wherein the operations further include:

prior to transmitting the first commit to the server, receiving an update from the server to one of the first entities that is resolved; and reapplying the first changes based on the update.

19. The system of claim 18, wherein reapplying the first changes includes:

determining a set of entities that are affected by a set of commits;

identifying an invariant associated with the set of entities that is no longer met;

responsive to a pending commit from the set of commits being associated with the invariant, removing the pending commit from the set of commits; and transforming the set of entities that are resolved by applying remaining changes described in remaining commits from the set of commits.

20. The system of claim 15, wherein the first changes are associated with a privacy-sensitive action performed by a user.

* * * * *